(No Model.) 3 Sheets—Sheet 1.
C. H. REYNOLDS.
MUSIC HOLDER.
No. 456,638. Patented July 28, 1891.
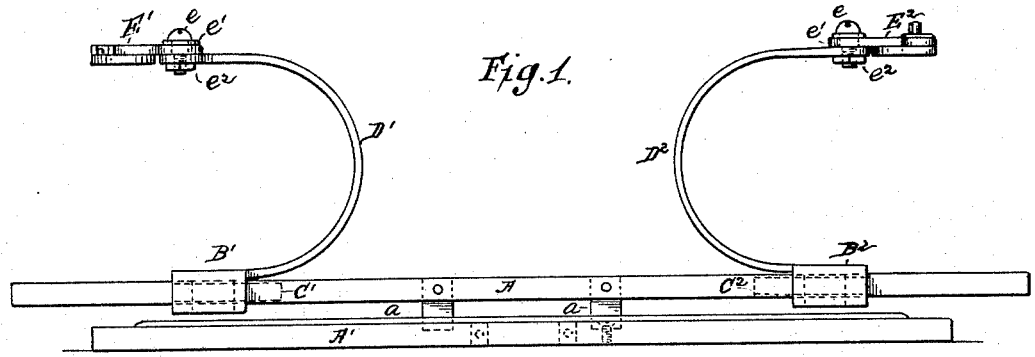
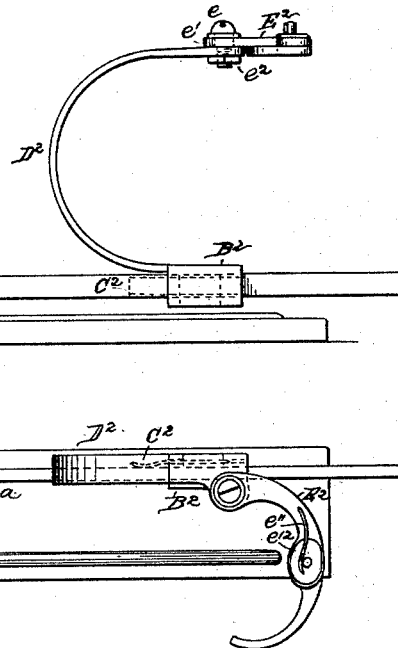
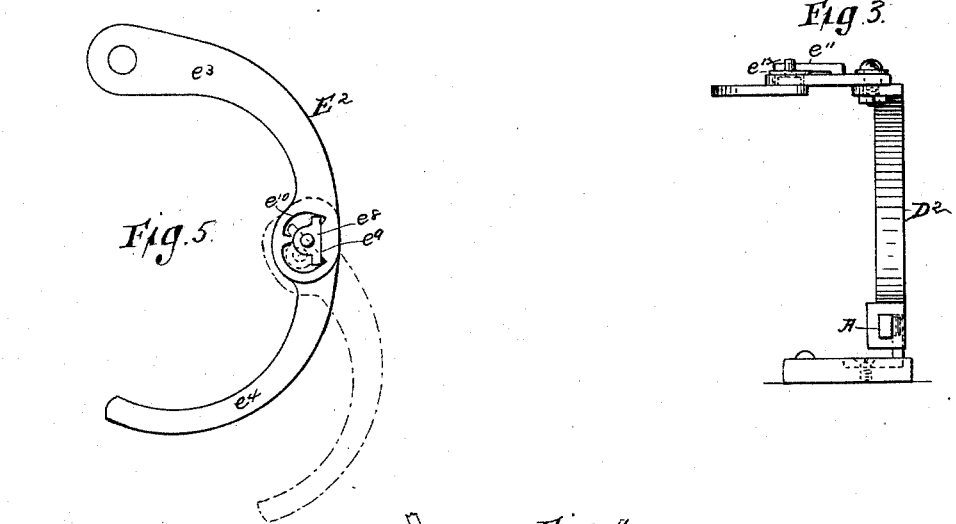
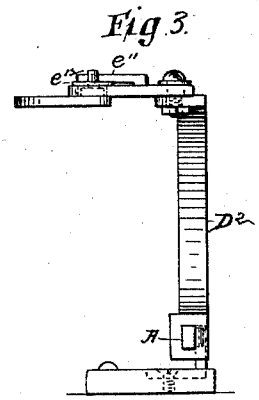
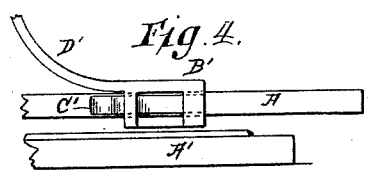
Witnesses
C. R. Ferguson
Wm. A. Pollock
Inventor
Charles H. Reynolds
By his attorney
Edwin H. Brown (No Model.) 3 Sheets—Sheet 2.
C. H. REYNOLDS.
MUSIC HOLDER.
No. 456,638. Patented July 28, 1891.
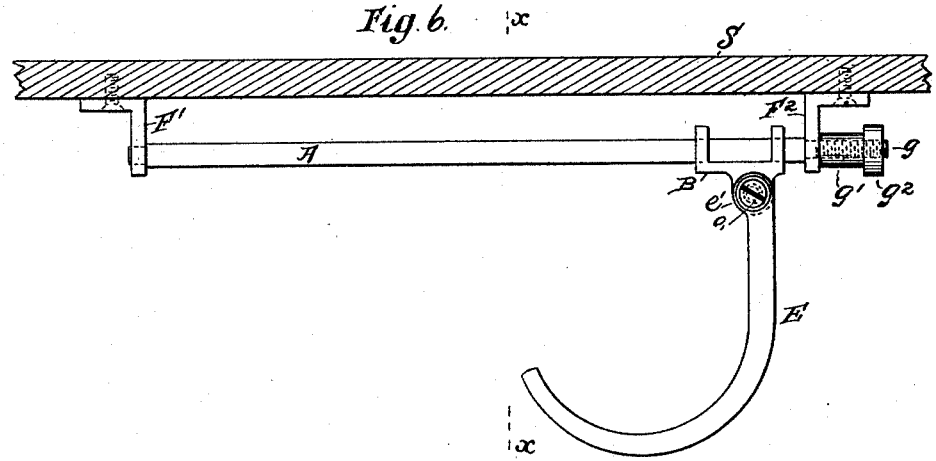
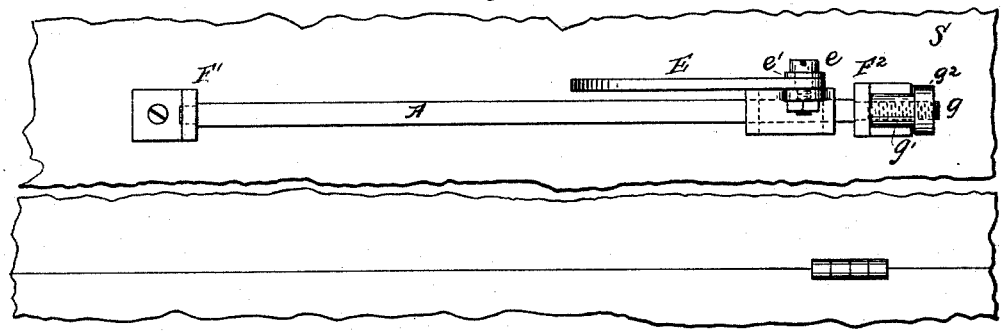
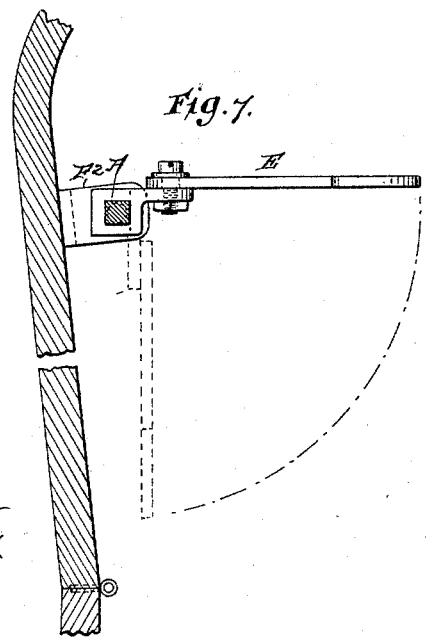
Witnesses
C. D. Ferguson
Wm A. Pollock
Inventor
Charles H. Reynolds
By his attorney
Edwin H. Brown (No Model.) 3 Sheets—Sheet 3.
C. H. REYNOLDS.
MUSIC HOLDER.
No. 456,638. Patented July 28, 1891.
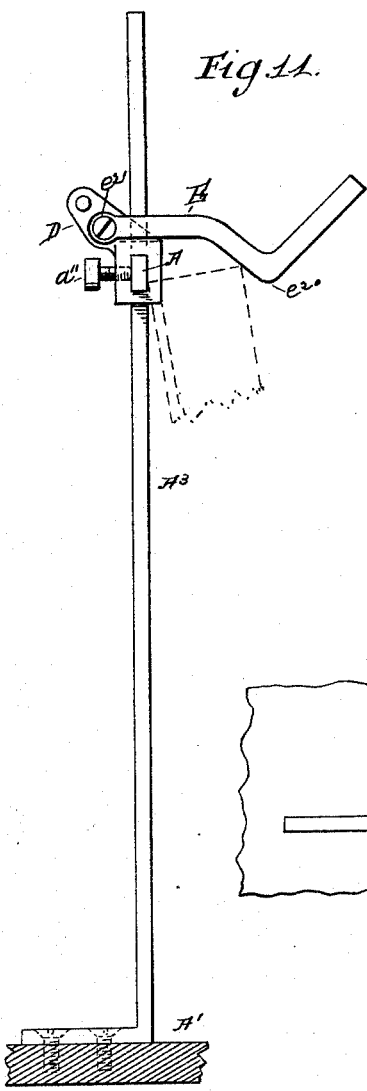
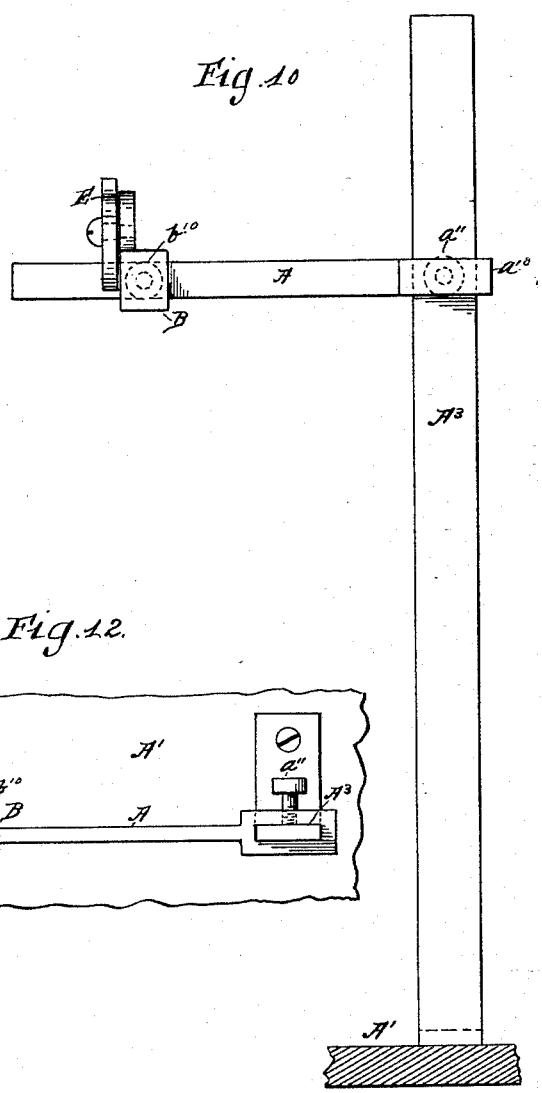
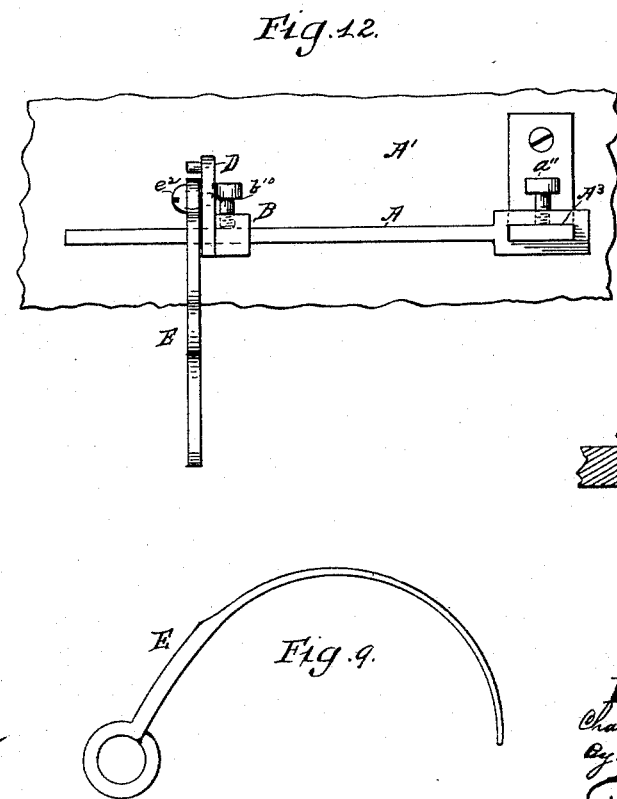
Witnesses
Inventor
Charles H. Reynolds

UNITED STATES PATENT OFFICE.

CHARLES H. REYNOLDS, OF YONKERS, NEW YORK.

MUSIC-HOLDER.

SPECIFICATION forming part of Letters Patent No. 456,638, dated July 28, 1891.

Application filed June 9, 1890. Serial No. 354,818. (No model.)

*To all whom it may concern:*

Be it known that I, CHARLES H. REYNOLDS, a citizen of the United States, and a resident of Yonkers, in the county of Westchester and State of New York, have invented certain new and useful Improvements in Music-Holders, of which the following is a specification.

The object of my improvement is to produce a simple and cheap contrivance for holding leaves of music while in use upon a musical instrument and withal permitting of the turning of the said leaves, as may be necessary by the performer.

I will describe a music-holder embodying my improvement, and then point out the novel features in the claims.

In the accompanying drawings, Figure 1 is a front view of a music-holder embodying my improvement. Fig. 2 is a top view. Fig. 3 is an end view. Fig. 4 is a rear view of certain parts. Fig. 5 is an enlarged plan view of one of the fingers. Fig. 6 is a horizontal section of a portion of a musical instrument and a top view of certain parts of a music-holder embodying my improvement and fitted thereto. Fig. 7 is a transverse section of the same part of the musical instrument and a sectional end view of the parts of the music-holder which are illustrated in Fig. 6. Fig. 8 is a front view of a portion of a musical instrument and a similar view of the parts of the music-holder which are illustrated by Figs. 6 and 7. Fig. 9 is a top view of a finger of modified construction. Fig. 10 is a front view of a music-holder of slightly-different construction embodying my improvement. Fig. 11 is a side view of the same. Fig. 12 is a top view of the same.

Similar letters of reference designate corresponding parts in all the figures.

I will first describe my improvement in connection with Figs. 1 to 5, inclusive. A designates a rail, which, preferably, will be made of metal, and is rectangular in the cross-section. It may be secured to any suitable base—as, for instance, to a board A'—which will form a rest for a music book or pamphlet. In the present instance the board A' is shown as provided with a socket $a'$, capable of receiving a standard or rod, whereby it may be fastened to a musical instrument and serving as a means of fastening the board A' thereto. As here shown, the rail A is supported by brackets $a$, which are fastened to it and the board A', said rail being elevated a short distance above the said board. On the rail A are fitted slides B' B². The advantage of a rectangular cross-section for the rail is owing to the fact that it will preclude the slides from turning. The slides are so combined with the rail as to prevent them from sliding too freely. I have shown them provided with springs C' C² for this purpose. These springs consist of strips of metal fastened at one end to the interior of the slides and at the other bearing against the rail. In this way sufficient friction will be generated between the slides and the rail to prevent a too easy movement of the slides. From the slides B' B² extend arms D' D², which constitute supports for fingers E' E². These arms D' D² are shown as consisting of strips of metal bent toward each other upwardly and outwardly. This particular shape is not, however, essential. The fingers E' E² are secured to the upper ends of the arms D, and in the present instance by means of screws $e$, which have heads that bear upon washers $e'$, arranged above the fingers, and have shanks which pass through the fingers and arms and engage with nuts $e^2$ below the arms. Obviously the fingers are capable of adjustment relatively to the arms. They are not, however, intended to oscillate while in use. These fingers are severally composed of two sections. They are represented as differing slightly in construction, but this is only to illustrate two different forms in which they may advantageously be made. The finger E' is composed of a main section $e^3$, which is fastened to the arm D', and a second section $e^4$, which is pivotally connected by a pin $e^5$ to the main section $e^3$. These two parts are made of thin metal and are curved longitudinally, so that they may pass around the side edges of leaves of music in order that the outer extremity of the section $e^4$ may press against the said leaves and hold them in position. A spring $e^6$, fastened to the main section $e^3$ and pressing against a rearward projection with which the section $e^4$ is provided, tends to oscillate the latter so that it may properly act upon leaves of music, and yet allows it to yield somewhat to facilitate its use, and also to prevent its interfering with the turning of the leaves. I have shown the outer extremity of the section $e^3$ as notched and the section $e^4$ as provided with a pin $e^7$, which extends up into the notch for the purpose of limiting the independent movement of the section $e^4$. The finger $E^2$ consists of a main section $e^3$, which is fastened to the arm $D^2$ and a second section $e^4$, which has a pivotal connection with the main section. These sections may be curved like the corresponding sections of the other arm $E'$. To the section $e^4$ is secured a pin $e^8$, having affixed to it a block $e^9$, which has a rounded front portion, a flat back, and extended ends. This block works in a hole or recess $e^{10}$, which is formed in the main section $e^3$ and is provided with a flat portion corresponding with the flat back of the block $e^9$, two rounded portions through which the extended ends of the blocks may move, and an inwardly-projecting portion which bears against the curved back of the block $e^9$. Owing to the peculiar construction of the block $e^9$ and the hole or recess $e^{10}$, the block $e^9$ may oscillate within the hole or recess $e^{10}$, and hence the second section $e^4$ of the finger $E^2$ may swing relatively to the main section of this arm. The pin $e^8$ projects above the main section $e^3$ of this finger. A spring $e^{11}$, fastened to the main section $e^3$ of the arms, bears against the upper end portion of the pin $e^8$ and exerts such a pressure thereon as will tend to keep the flat back of the block $e^9$ against the flat surface of the hole or recess $e^{10}$. This spring will, however, yield so as to allow the oscillation of the block, and consequently the swinging of the second section of the arm. Preferably a plate $e^{12}$ will be fastened to the pin $e^8$, above the main section $e^3$, to cover the hole or recess $e^{10}$.

In Figs. 6, 7, and 8 I have only shown one-half of a music-holder. S designates a portion of a cover of a musical instrument, which is hinged in place and capable of being swung down to cover the case. To that one of its sides which is inward when the cover is closed brackets $F'$ $F^2$ are fastened by screws or otherwise. These brackets support a rail A, made in the form of a shaft, which is free to rotate within them, but is of polygonal form, excepting at its journals. On this shaft A is fitted a slide B, which is so constructed as to be capable of moving lengthwise of the shaft, but so as to be incapable of rotary or oscillating motion about the shaft. One of the journals $g$ of the shaft A is elongated, and has fitted to it outside the bracket $F^2$ a tube of india-rubber $g'$. It is screw-threaded at the extremity, and beyond the tube $g'$ has fitted to it a nut $g^2$. By turning this nut more or less pressure may be put upon the tube $g'$ to vary the resistance offered to the rotation or oscillation of the shaft G. The shaft will maintain any position into which it may be adjusted unless a considerable amount of force be applied to it for the purpose of moving it into another position. The slide B will fit the shaft so tightly as to be prevented from moving very freely along the same. The finger E shown in this example of my improvement is not composed of two sections, but is curved substantially in the same manner as the fingers previously described. It is connected to the slide B in the same manner that the fingers $E'$ $E^2$ are connected to their slides. When the cover S is opened, the shaft A may be oscillated to adjust the finger E into a substantially horizontal position, as represented in bold outline in Figs. 7 and 8. When the cover is to be closed, the rail G may be oscillated to adjust the finger into a position substantially parallel with the cover, as represented by dotted lines in Fig. 7. Then the cover may be closed.

In Fig. 9 I have shown a finger E, which is made so thin as to be resilient throughout a great portion of its length. Such a finger forms a serviceable equivalent for the fingers having two sections previously described.

In Figs. 10, 11, and 12, A designates a rail, which is shown as supported by an upright $A^3$, fastened to any suitable support—as, for instance, a board $A'$. The rail A has a slide $a^{10}$, which fits the support $A^3$, so as to be capable of sliding vertically along the latter. A set-screw $a^{11}$, engaging with a tapped hole in the slide and impinging against the support $A^3$, serves to secure the slide $a^{10}$ in position. Owing to this manner of supporting the rail A it may be adjusted to occupy different positions above the board $A'$. B designates a slide fitting the rail A and capable of moving lengthwise of the latter. It is shown as provided with a screw $b^{10}$, which engages with a tapped hole in it and impinges against the rail, so that it may fasten the slide in position after adjustment. From the slide B an arm D extends upward and rearward. To it is pivoted a finger which extends forward over the rail A and is bent downward and then upward to form a downwardly-extending V-shaped projection $e^{20}$. A pin or screw $e^{21}$ serves to pivot this finger to the arm. A music book or pamphlet may be placed upon the board $A'$. Then the rail A will be adjusted vertically, so as to be substantially on a level with the top of said book or pamphlet. Then the finger E will extend over the top edge of the leaves, and by gravity this projection $e^{20}$ will descend in front of the leaves.

The parts which I have illustrated in Figs. 10, 11, and 12 are only intended for one side of a book or pamphlet—namely, that side which will be to the right of the player. These are intended to be duplicated for the other side.

What I claim as my invention, and desire to secure by Letters Patent, is—

1. In a music-holder, the combination of a rail, a slide movable lengthwise of the rail, an arm extending from the slide transversely to the length of the rail, a finger fastened to the arm and constructed of two sections longitudinally curved in substantially the same direction, the outer of said sections being movable independently of the other, and means for limiting the movement of said section, substantially as specified.

2. In a music-holder, the combination of a rail, a slide movable lengthwise of the rail, a friction device therefor, an arm extending from the slide transversely to the length of the rail, a finger fastened to the arm and consisting of two sections pivotally connected together, the said sections having a longitudinal curve in substantially the same direction, and a spring connected to one of said sections and acting upon the other, substantially as specified.

3. In a music-holder, the combination of a rail made in the form of an oscillating shaft, a friction device coacting with the same to preclude it from oscillating, a slide on said rail, an arm extending from the slide, and a finger fastened to said arm and longitudinally bent or curved to extend across the edges of leaves of music, substantially as specified.

4. In a music-holder, the combination of a rail made in the form of an oscillating shaft, a friction device coacting with the same to preclude it from oscillating, and consisting of a tube $g$, applied to one of the journals, and a nut compressing said tube between it and one of the supporting-brackets, a slide on said rail, an arm extending from the slide, and a finger fastened to said arm and longitudinally bent or curved to extend across the edges of leaves of music, substantially as specified.

5. In a music-holder, the combination of a rail, a slide movable lengthwise of the rail, an arm extending from the rail transversely to the length of said rail, and a longitudinally-bent finger fastened to the arm and consisting of two parts pivotally connected together, whereby the outer part is free to yield in both directions relatively to its normal position, substantially as specified.

Signed at New York, in the county of New York and State of New York, this 22d day of May, A. D. 1890.

CHARLES H. REYNOLDS.

Witnesses:
S. O. EDMONDS,
WM. M. ILIFF.